UNITED STATES PATENT OFFICE.

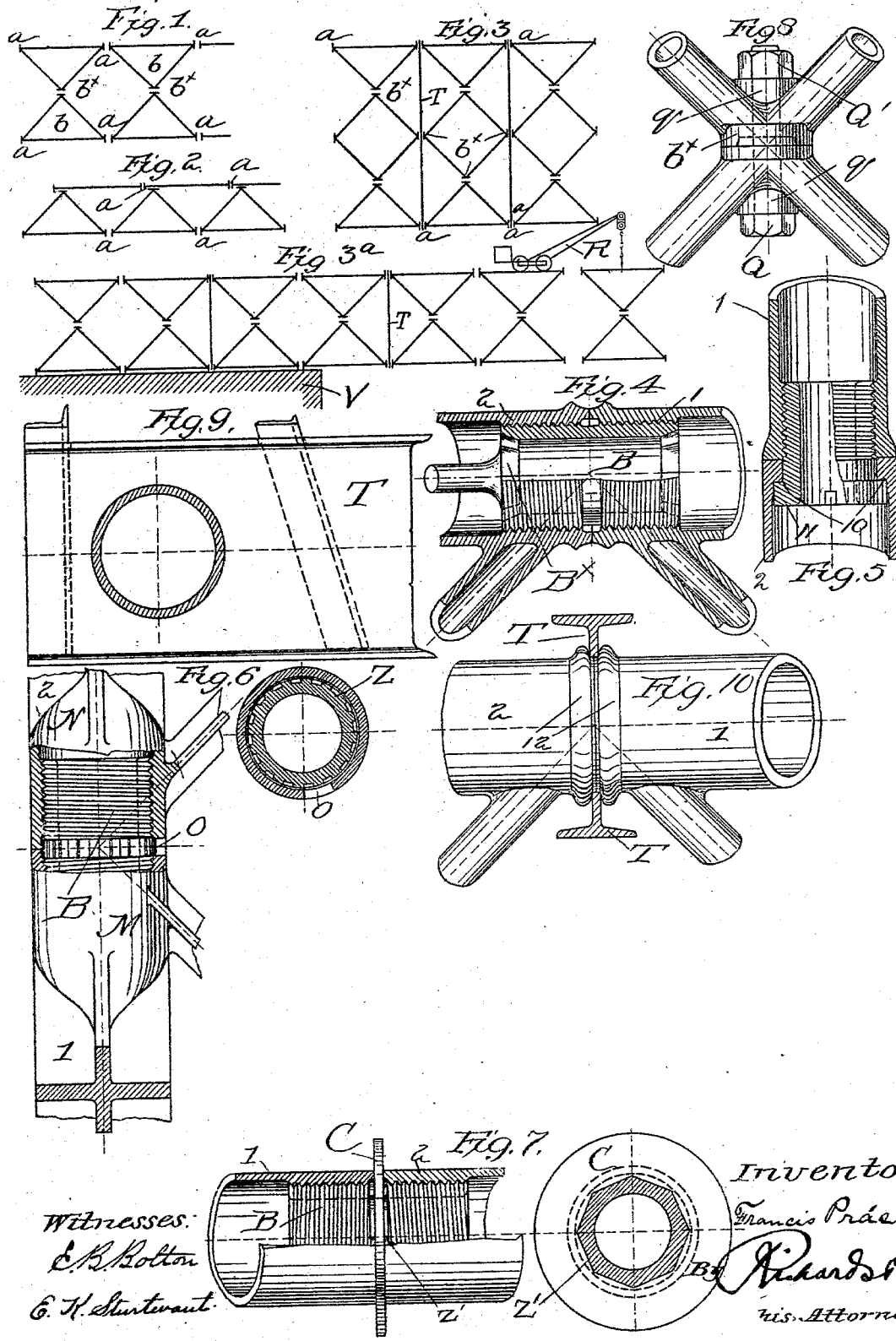

FRANCIS PRÁSIL, OF PRAGUE, AUSTRIA-HUNGARY.

TRANSPORTABLE METALLIC BRIDGE.

SPECIFICATION forming part of Letters Patent No. 515,445, dated February 27, 1894.

Application filed March 15, 1893. Serial No. 466,060. (No model.)

*To all whom it may concern:*

Be it known that I, FRANCIS PRÁSIL, a subject of the Emperor of Austria-Hungary, residing at Prague, Bohemia, Austria-Hungary, have invented certain new and useful Improvements in Constructions for Transportable Metallic Bridges, of which the following is a specification.

My invention relates particularly to the construction of the sections composing the structure to be used in bridge building or for like purposes and to the manner of securing said sections to each other.

In the drawings, Figures 1, 2, 3, and $3^a$ are diagrammatic views of the sections arranged in different ways to form different structures. Fig. 4, is a sectional detail view of the manner of joining two of the tubular sections. Fig. 5, is a detail sectional view of a modification. Figs. 6 and 7 are similar views of other modifications. Fig. 8, is a side view showing in detail the manner of uniting two triangular sections at their apices. Figs. 9 and 10 show the tubular parts arranged in connection with a beam or girder.

Fig. 1, represents an iron frame work composed of triangular sections $b$ having flanges at their corners arranged to bear against each other. These sections are made up of tubular bars and they are held together at the corners $a$ by the right and left threaded coupling B, Fig. 4, engaging the right and left threaded ends 1 and 2 said coupling acting to draw the tubular ends of the sections into firm contact as shown in Fig. 4. The coupling may be turned by introducing a key $B^\times$ through the tubular section last added to the structure to engage the coupling which as shown lies entirely within the tubular parts. The triangular sections are connected at their apices $b^\times$ as shown in Fig. 8, by the headed bolt Q and nut Q′, the said sections having bosses $q$ cast therewith upon which the head and nut bear. Instead of having triangular sections they may be of square or any other desired form as shown in Fig. 3, where said square sections form the central part of the structure combined with which are the triangular sections shown.

Instead of operating the right and left threaded coupling as in Fig. 4, said coupling may be formed with a central polygonal or flat sided portion Z′ (see Fig. 7), over which fits the rim or plate C to project beyond the tubes so that it may be turned to rotate the threaded coupling and thus draw the two section ends 1 and 2 together or tightly against the plate C.

In Fig. 6, the coupling has a toothed central portion by which it may be turned when engaged by a suitable implement introduced through the opening O formed between the meeting ends of the tubular ends of the parts 1 and 2. These parts may be solid bars or braces as shown in Fig. 6, but the tubular ends constitute tubular sockets M, N, as shown. Where one tubular part is larger than the other as in Fig. 5, the larger part has a shoulder or flange 10, and the coupling instead of being threaded at both ends is threaded only into the smaller tube its opposite end having a head or flange 11, to bear on the shoulder 10.

The cross braces T, Figs. 3, $3^a$, 9 and 10 are of I iron and are perforated to receive the ends of the tubular parts as in Figs. 9 and 10 or to receive the coupling which connects two opposing tubular ends and draws them into firm contact with the I iron, said ends having flanges 12, as shown in Fig. 10.

Fig. $3^a$ shows the mounting of my portable iron and steel structure for bridges and the like. The right hand part is held by the left hand part, which is firmly anchored upon the shore V. New sections are added by means of the crane R, which travels upon the upper bars.

I claim—

1. A structure comprising the sections having tubular ends, the girders perforated and fitting between the same and the coupling passing through the girder and connecting the tubular ends, substantially as described.

2. A structure comprising angular sections arranged with their apices in contact, the bosses $q$ at the said apices and the bolts Q for connecting the contiguous apices of the sections, substantially as described.

3. A structure comprising the angular sections arranged with their apices in contact, the bolts Q for connecting the apices of the adjacent sections, said sections having tubular portions in line with each other and the internal couplings for connecting said aligned portions, substantially as described.

In witness whereof I have hereunto set my hand in presence of two witnesses.

FRANCIS PRÁSIL.

Witnesses:
 SAM. FISCHER,
 L. VOJÀCEK.